US006833965B2

(12) United States Patent
Togino et al.

(10) Patent No.: US 6,833,965 B2
(45) Date of Patent: Dec. 21, 2004

(54) OPTICAL ELEMENT USING ORGANIC-INORGANIC COMPOSITE MATERIAL

(75) Inventors: Takayoshi Togino, Koganei (JP); Yuko Morita, Hachioji (JP); Hiroaki Kinoshita, Hachioji (JP)

(73) Assignee: Olympus Corporation, Tokyo (JP)

( * ) Notice: Subject to any disclaimer, the term of this patent is extended or adjusted under 35 U.S.C. 154(b) by 283 days.

(21) Appl. No.: 09/918,555

(22) Filed: Aug. 1, 2001

(65) Prior Publication Data

US 2002/0041447 A1 Apr. 11, 2002

(30) Foreign Application Priority Data

Aug. 2, 2000 (JP) ........................................ 2000-234056

(51) Int. Cl.[7] ........................... G02B 17/00; G02B 3/02; G02B 13/18; C08K 3/34
(52) U.S. Cl. ....................... 359/726; 359/653; 359/708; 359/720; 524/492; 524/493; 524/588
(58) Field of Search ................................ 524/492, 493, 524/588; 359/653, 708, 720, 726

(56) References Cited

U.S. PATENT DOCUMENTS

| 4,639,329 | A | * | 1/1987 | Makishima et al. ...... 252/501.1 |
| 4,913,845 | A | * | 4/1990 | Gillberg-LaForce et al. ........................ 252/582 |
| 5,143,659 | A | * | 9/1992 | Hamblen et al. ............. 264/1.1 |
| 6,124,964 | A | * | 9/2000 | Imanishi et al. ............ 359/248 |
| 6,476,098 | B1 | * | 11/2002 | Arakawa et al. ............ 523/206 |
| 6,534,589 | B1 | * | 3/2003 | Yoshimura et al. ......... 524/765 |
| 6,590,722 | B1 | * | 7/2003 | Koyama et al. ............ 359/820 |

FOREIGN PATENT DOCUMENTS

JP 5-85860 4/1993

OTHER PUBLICATIONS

Toki, *Research on Organic–Inorganic Molecular Hybrids from Sol–Gel Processing*, Engineering Materials, vol. 46, No. 8 (1998), p. 26–31.

Yano, *Organic–Inorganic Hybrid Materials Prepared by Sol–Gel Process*, Materials Science, vol. 36, No. 5, Sep. 1999 (Journal of the Materials Science Society of Japan), pp. 39–46.

* cited by examiner

*Primary Examiner*—Tae H. Yoon
(74) *Attorney, Agent, or Firm*—Pillsbury Winthrop LLP

(57) ABSTRACT

A lightweight and homogeneous optical element exhibiting favorably weak birefringence and hygroscopicity as well as superior productivity and producing minimal chromatic aberrations is formed by using an organic-inorganic composite material having both the properties of a glass material and those of a plastic material. The optical element has at least one entrance refracting surface and at least one exit refracting surface. The optical element is formed from an organic-inorganic composite material having an inorganic phase dispersed in the three-dimensional network (matrix) of an organic phase.

17 Claims, 9 Drawing Sheets

OPTICAL ELEMENT USING ORGANIC-INORGANIC COMPOSITE MATERIAL

This application claims benefit of Japanese Application No. 2000-234056 filed in Japan on Aug. 2, 2000, the contents of which are incorporated by this reference.

BACKGROUND OF THE INVENTION

1. Field of the Invention

The present invention relates to an optical element using an organic-inorganic composite material. More particularly, the present invention relates to an optical element using organic-inorganic composite material which is suitable for use in optical systems such as an image pickup system and an ocular system.

2. Discussion of Related Art

Conventional transparent optical elements are produced by using a glass material (inorganic material) or a plastic material (organic material). When a glass material is used to produce an optical element, polishing is generally performed to form the material into the desired shape. Therefore, a great deal of time is required to carry out the polishing process. In the case of a plastic material, on the other hand, an optical element can be produced by injection molding. Accordingly, optical elements formed from a plastic material are superior in productivity but inferior in temperature characteristics. In addition, the number of kinds of plastic materials usable to produce optical elements is unfavorably small. In particular, there is no plastic material exhibiting a high refractive index.

There has recently been known a method of producing an optical element from a glass material by molding. With this method, however, the kinds of glass materials usable for production by molding are limited. Usable glass materials are restricted within a very narrow range. There is also a method wherein an optical element is molded from a thermosetting resin material as a plastic material. This method also has the disadvantage that usable thermosetting resin materials are limited. In particular, there is no thermosetting resin material having a high refractive index and exhibiting minimal dispersion.

Let us put the above-described problems in order.
Problems of glass materials:
1. Heavy in specific gravity.
2. Inferior in productivity.

Problems of plastic materials:
1. There is no plastic material having a high refractive index and exhibiting minimal dispersion.
2. Plastic materials are hygroscopic.
3. Exhibiting birefringence.
4. Weak in mechanical strength Conventional optical elements using a glass material are heavy in specific gravity. Therefore, an increase in weight gives rise to a problem, particularly in the case of an optical element having a large lens aperture, e.g. an ocular lens. Weight is a matter of great concern for an optical element having a large aperture, e.g. a telephotographic lens for use with a camera. In addition, because lenses using a glass material are produced by polishing, much time is required for the polishing process.

Regarding plastic materials, there is no plastic material having a high refractive index, in particular. High-refractive index materials used for eyeglasses exhibit large dispersion and hence cause large chromatic aberrations. Because they are thermosetting plastic materials, a great deal of time is required for setting. Further, because plastic materials are hygroscopic, optical elements molded therefrom absorb water contained in the air even under normal environmental conditions, causing a change in shape and also a change in refractive index.

SUMMARY OF THE INVENTION

The present invention was made in view of the above-described problems with the prior art.

An object of the present invention is to provide a lightweight and homogeneous optical element exhibiting favorably weak birefringence and hygroscopicity as well as superior productivity and producing minimal chromatic aberrations by using an organic-inorganic composite material having both the properties of a glass material and those of a plastic material.

To attain the above-described object, the present invention provides an optical element having at least one entrance refracting surface and at least one exit refracting surface. The optical element is formed from an organic-inorganic composite material.

The optical element using an organic-inorganic composite material according to the present invention will be described below.

Recently, attention has being paid to organic-inorganic composite materials having an ultramicro structure in which an inorganic phase is dispersed in the three-dimensional network (matrix) of an organic phase as organic-inorganic hybrid materials [for example, see the August 1998 issue of "Engineering Materials" (Vol. 16, No. 8), pp. 26–31, and the September 1999 issue of "Materials Science" (Vol. 36, No. 5, pp. 39–45]. Such an organic-inorganic hybrid material has both the characteristic features of an organic polymer (e.g. moldability and low density) and those of an inorganic compound (e.g. transparency). The physical properties of the organic-inorganic hybrid material conform to the rules of composition of the organic and inorganic components.

Accordingly, it is possible to obtain a material of high refractive index and low dispersion, which cannot be realized with a plastic material, by appropriately selecting a material for the inorganic phase and a material for the organic phase and selecting an appropriate mixture ratio for the two materials. The organic-inorganic hybrid material thus obtained exhibits superior moldability and hence allows an optical element of desired shape to be obtained by injection molding.

Such an organic-inorganic hybrid material may be produced, for example, by mixing together an organic polymer and a metal alkoxide or a glass precursor (e.g. tetraethoxy silane). Organic-inorganic composite materials obtained in this way include one in which oxygen in the organic polymer and the protons of Si—OH groups in the inorganic polymer bond to each other by hydrogen bonding. Another organic-inorganic composite material has chemical bonding between the organic polymer and the inorganic disperse phase. For example, there is an organic-inorganic composite material having covalent bonding such as —NH—NCOH— as a result of polymerization of —$NH_2$ group at the end of the inorganic disperse phase with —NCO group.

To ensure the transparency of such an organic-inorganic composite material, it is necessary that the micro structure of the dispersed inorganic phase should have a size not more than the working wavelength. It is desirable that the size of the micro structure should be not larger than 200 nanometers, preferably not larger than 100 nanometers, even more preferably not larger than 20 nanometers.

As the inorganic component of an organic-inorganic composite material, it is preferable to use one selected from among inorganic matters (oxides and nitrides) containing metals belonging to Group IVA in the periodic table of the elements, e.g. Ti and Zr, metals belonging to Group IIIB, e.g. Al, and metals belonging to Group IVB, e.g. Si and Ge. From the viewpoint of ease of use, Si, Ti, Al and Zr are particularly preferable. As a component for imparting high-refractive index properties, it is preferable to use a metal belonging to Group IIIA, e.g. a lanthanoid such as Y or La, or a metal belonging to Group VA, e.g. Nb or Ta, in the form of a composite material combined with Si, Ti, Al, or Zr. It is possible to use metal alkoxides containing these components, derivatives and metal salts thereof, etc.

As the organic component of an organic-inorganic composite material, it is possible to use most organic polymers compatible with the inorganic material used in the process of mixing, gelation, drying and setting and capable of forming hydrogen bonds or covalent bonds with the inorganic material. More specifically, substances containing structures such as —COOH group, —NH$_2$ group, —OH group and a group containing S have interaction with —H, COOH group, —NH$_2$ group, —OH group, etc. contained in oligomers formed by hydrolysis of a part of metal alkoxides or derivatives used as inorganic matter. Various organic matters are usable as materials that form hydrogen bonds or covalent bonds with the inorganic material, e.g. polyurethane, urea resin, polyamide, polyimide, polycarbonate, and polyvinyl alcohol. To form covalent bonds with the inorganic material, the above-described organic matter is used after a functional group such as an alkoxide group capable of reacting with the inorganic material has been introduced into the organic polymer chain. Generally speaking, organic-inorganic hybrid materials in which the organic material covalently bonds to the inorganic material are superior in mechanical strength because covalent bonding is stronger than hydrogen bonding.

Incidentally, when an optical element is formed by using an organic-inorganic composite material as stated above, it is desirable that at least two transmitting surfaces of the optical element should have an optical power.

If a transmitting surface of an optical element has an optical power, chromatic aberrations produced by the refracting surface increase. The increased chromatic aberrations of the optical element can be corrected by another optical element when an optical system is constructed by combining together a plurality of optical elements. In this regard, it is preferable to use the above-described organic-inorganic composite material. With the organic-inorganic composite material, it is possible to form an optical element of low dispersion and hence possible to construct an optical system using an optical element producing minimal chromatic aberrations.

In addition, the use of the above-described organic-inorganic composite material allows the refractive index to be increased. Consequently, it becomes possible to minimize spherical aberration, astigmatism and image distortion. The power P of a surface is expressed by P=(n−1)/R (n is the refractive index and R is the radius of curvature). Accordingly, the curvature radius R can be increased according as the refractive index n becomes higher. Thus, it is possible to minimize aberrations produced by the optical element.

In addition, the optical element may have at least one reflecting surface. When a light ray passing through the center of an object and the center of a stop is defined as an axial principal ray, the optical element may be arranged so that the axial principal ray is bent in the organic-inorganic composite material.

If the optical element has one reflecting surface, the optical path of the axial principal ray passes through the same material twice. Consequently, the optical element needs a sufficiently high transmittance. A favorably high transmittance can be obtained by using the above-described organic-inorganic composite material, which is less birefringent and hygroscopic than plastic materials. Further, if a reflecting surface is included in the optical element, the axial principal ray passes along a folded optical path, resulting in an increase in the optical path length. Accordingly, the volumetric capacity of the optical element can be reduced in comparison to a lens having only refracting surfaces. Therefore, it is even more preferable from the viewpoint of achieving a reduction in weight that the optical element should have a reflecting surface.

In this case, it is desirable that the at least one reflecting surface should have an optical power.

A reflecting surface having an optical power is usually constructed in the form of a back-coated mirror. Therefore, the amount of aberrations produced in the optical element reduces favorably. The optical power of a back-coated mirror is expressed by P=2n/R. Accordingly, the effect of using a high refractive index becomes more remarkable than in the case of an optical element formed from only transmitting surfaces. In addition, it is possible to reduce the power assigned to the transmitting surfaces by an amount corresponding to the power given to the reflecting surface. Consequently, the amount of aberrations produced in the optical element can be minimized synergistically by the effect of using an reflecting surface with an optical power and the effect of using a high refractive index.

It is desirable that the at least one reflecting surface should have a rotationally asymmetric surface configuration that corrects decentration aberrations due to decentration.

When the optical path is bent by a reflecting surface, decentration aberrations occur to a considerable extent. It is difficult to correct the decentration aberrations by using the transmitting surfaces. The decentration aberrations can be corrected by a rotationally asymmetric surface. Therefore, a rotationally asymmetric surface configuration is given to the reflecting surface to correct the decentration aberrations.

In the present invention, a free-form surface is used as a typical example of a surface having a rotationally asymmetric curved surface configuration. A free-form surface is defined by the following equation. The Z-axis of the defining equation is the axis of a free-form surface.

$$Z = cr^2 / \left[1 + \sqrt{\{1-(1+k)c^2r^2\}}\right] + \sum_{j=2}^{66} C_j X^m Y^n \quad \text{(a)}$$

In the equation (a), the first term is a spherical surface term, and the second term is a free-form surface term.

In the spherical surface term:

c: the curvature at the vertex k: a conic constant $r=\sqrt{(X^2+Y^2)}$

The free-form surface term is given by $$\sum_{j=2}^{66} C_j X^m Y^n = C_2 X + C_3 Y +$$

$$C_4 X^2 + C_5 XY + C_6 Y^2 +$$

$$C_7 X^3 + C_8 X^2 Y + C_9 XY^2 + C_{10} Y^3 +$$

$$C_{11} X^4 + C_{12} X^3 Y + C_{13} X^2 Y^2 + C_{14} XY^3 + C_{15} Y^4 +$$

$$C_{16} X^5 + C_{17} X^4 Y + C_{18} X^3 Y^2 + C_{19} X^2 Y^3 + C_{20} XY^4 +$$

$$C_{21} Y^5 +$$

$$C_{22} X^6 + C_{23} X^5 Y + C_{24} X^4 Y^2 + C_{25} X^3 Y^3 + C_{26} X^2 Y^4 +$$

$$C_{27} XY^5 + C_{28} Y^6 +$$

$$C_{29} X^7 + C_{30} X^6 Y + C_{31} X^5 Y^2 + C_{32} X^4 Y^3 + C_{33} X^3 Y^4 +$$

$$C_{34} X^2 Y^5 + C_{35} XY^6 + C_{36} Y^7$$

$$\ldots$$

where $C_j$ (j is an integer of 2 or higher) are coefficients.

In general, the above-described free-form surface does not have planes of symmetry in both the XZ- and YZ-planes. However, a free-form surface having only one plane of symmetry parallel to the YZ-plane is obtained by making all terms of odd-numbered degrees with respect to X zero. A free-form surface having only one plane of symmetry parallel to the XZ-plane is obtained by making all terms of odd-numbered degrees with respect to Y zero.

In addition, free-form surfaces as the above-described surfaces with a rotationally asymmetric curved surface configuration may be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), R is the distance from the Z-axis in the XY-plane, and A is the azimuth angle about the Z-axis, which is expressed by the angle of rotation measured from the Z-axis.

$$x = R \times \cos(A) \quad \text{(b)}$$

$$y = R \times \sin(A)$$

$$z = D_2 + D_3 R\cos(A) + D_4 R\sin(A) + D_5 R^2 \cos(2A) + D_6(R^2 - 1) +$$

$$D_7 R^2 \sin(2A) + D_8 R^3 \cos(3A) + D_9 (3R^3 - 2R)\cos(A) +$$

$$D_{10}(3R^3 - 2R)\sin(A) + D_{11} R^3 \sin(3A) + D_{12} R^4 \cos(4A) +$$

$$D_{13}(4R^4 - 3R^2)\cos(2A) + D_{14}(6R^4 - 6R^2 + 1) +$$

$$D_{15}(4R^4 - 3R^2)\sin(2A) + D_{16} R^4 \sin(4A) + D_{17} R^5 \cos(5A) +$$

$$D_{18}(5R^5 - 4R^3)\cos(3A) + D_{19}(10R^5 - 12R^3 + 3R)\cos(2A) +$$

$$D_{20}(10R^5 - 12R^3 + 3R)\sin(A) + D_{21}(5R^5 - 4R^3)\sin(3A) +$$

$$D_{22} R^5 \sin(5A) + D_{23} R^6 \cos(6A) + D_{24}(6R^6 - 5R^4)\cos(4A) +$$

$$D_{25}(15R^6 - 20R^4 + 6R^2)\cos(2A) + D_{26}(20R^6 - 30R^4 + 12R^2 - 1) +$$

$$D_{27}(15R^6 - 20R^4 + 6R^2)\sin(2A) + D_{28}(6R^6 - 5R^4)\sin(4A) +$$

$$D_{29} R^6 \sin(6A)\ldots$$

where $D_m$ (m is an integer of 2 or higher) are coefficients. It should be noted that to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above defining equations are shown to exemplify surfaces with a rotationally asymmetric curved surface configuration. Therefore, the same advantageous effects can be obtained for any other defining equation that expresses such a rotationally asymmetric curved surface configuration.

It should be noted that other examples of defining equations for free-form surfaces include the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 Y + C_4 |X| + C_5 Y^2 + C_6 Y|X| + C_7 X^2 + \quad \text{(c)}$$

$$C_8 Y^3 + C_9 Y^2 |X| + C_{10} YX^2 + C_{11} |X^3| +$$

$$C_{12} Y^4 + C_{13} Y^3 |X| + C_{14} Y^2 X^2 + C_{15} Y|X^3| + C_{16} X^4 +$$

$$C_{17} Y^5 + C_{18} Y^4 |X| + C_{19} Y^3 X^2 + C_{20} Y^2 |X^3| + C_{21} YX^4 +$$

$$C_{22} |X^5| + C_{23} Y^6 + C_{24} Y^5 |X| + C_{25} Y^4 X^2 + C_{26} Y^3 |X^3| +$$

$$C_{27} Y^2 X^4 + C_{28} Y|X^5| + C_{29} X^6 + C_{30} Y^7 + C_{31} Y^6 |X| +$$

$$C_{32} Y^5 X^2 + C_{33} Y^4 |X^3| + C_{34} Y^3 X^4 + C_{35} Y^2 |X^5| +$$

$$C_{36} YX^6 + C_{37} |X^7|\ldots$$

It should be noted that an anamorphic surface or a toric surface is also usable as a surface having a rotationally asymmetric curved surface configuration.

Further, it is desirable that the optical element according to the present invention should have at least two reflecting surfaces, and at least one of the at least two reflecting surfaces should have a rotationally asymmetric surface configuration that corrects decentration aberrations due to decentration.

If the optical element has at least two reflecting surfaces as stated above, the power is dispersed effectively, so that the aberrations can be corrected favorably.

The arrangement may be such that the optical element has two reflecting surfaces, and the entrance surface and the exit surface are disposed to face each other so that the axial principal ray passes along a substantially round-trip optical path.

If the entrance surface and the exit surface are disposed to face each other, the optical path becomes a substantially Z-shaped round-trip optical path. Consequently, it is possible to place the entrance surface and one reflecting surface side by side and it is also possible to place the exit surface and another reflecting surface side by side. Accordingly, a compact optical element can be constructed. The use of the organic-inorganic composite material allows the optical element to be further reduced in weight.

The entrance surface and the exit surface may be placed adjacent to each other so that the axial principal ray passes along a substantially intersecting optical path.

In this case, the optical path crosses itself within the optical element. The optical path passes through the same portion twice in different directions of passage of rays. Therefore, it is particularly important to use the organic-inorganic composite material, which exhibits favorably weak birefringence and hygroscopicity.

The optical element according to the present invention may be positioned in the vicinity of a stop of an optical system.

With the above-described arrangement, when the refractive index is increased, it becomes possible to suppress the occurrence of spherical aberration in particular. When the Abbe's number is increased (i.e. dispersion is reduced), the occurrence of axial chromatic aberration can be suppressed effectively.

The optical element according to the present invention may be positioned in the vicinity of an object or an image plane.

With the above-described arrangement, favorable effects can be obtained with respect to astigmatism, coma, image distortion, and curvature of field. When the refractive index is increased, it becomes possible to reduce the occurrence of various aberrations. Consequently, the load on another optical element used to correct these aberrations reduces favorably.

Further, it is desirable to satisfy the following condition:

$$\nu > -195n + 352.5 \qquad (1)$$

where n is the refractive index for the spectral d-line of the organic-inorganic composite material and $\nu$ is the Abbe's number thereof.

FIG. 5 is a diagram showing the relationship between the refractive index n for the spectral d-line and Abbe's number $\nu$ of existing plastic materials and organic-inorganic composite materials used in Examples (described later) of the present invention. The refractive index n and Abbe's number $\nu$ of each of the materials are as follows (in FIG. 5, ♦ represents the existing plastic materials, ● represents the organic-inorganic composite materials used in Examples).

| Materials | n | $\nu$ |
|---|---|---|
| PMMA | 1.49 | 58 |
| "ZEONEX" | 1.52 | 55 |
| "ARTON" | 1.52 | 52 |
| PC | 1.58 | 30 |
| MS | 1.56 | 35 |
| O-PET | 1.62 | 24 |
| Thermosetting type | 1.66 | 32 |
| UV-curing type | 1.64 | 23 |
| "CYTOP" | 1.34 | 90 |
| Example 1 (6) | 1.70 | 50 |
| Example 2 (7) | 1.75 | 28 |
| Example 3 (8) | 1.80 | 26 |
| Example 4 (9) | 1.61 | 58 |
| Example 5 (10) | 1.66 | 57 |

In FIG. 5, the straight solid line represents the relationship of $\nu = -195n + 352.5$. Organic-inorganic composite materials located above the solid line [i.e. satisfying condition (1)] exhibit reduced wavelength dispersion and are favorable for use to form optical elements of optical devices using a white light source in particular.

It is more desirable to satisfy the following condition:

$$\nu > -175n + 326 \qquad (2)$$

where n is the refractive index for the spectral d-line of the organic-inorganic composite material and $\nu$ is the Abbe's number thereof.

In FIG. 5, the straight dashed line represents the relationship of $\nu = -175n + 326$. Organic-inorganic composite materials located above the dashed line [i.e. satisfying condition (2)] exhibit further reduced wavelength dispersion and are even more favorable for use to form optical elements of optical devices using a white light source in particular.

Regarding the Abbe's number, it is desirable to satisfy the following condition:

$$20 < \nu < 65 \qquad (3)$$

If the Abbe's number is reduced to increase dispersion, the amount of chromatic aberrations produced by the refracting surfaces increases. Because the reflecting surface produces no chromatic aberration in theory, the chromatic aberrations produced in the optical element cannot be corrected by the reflecting surface. The chromatic aberrations of the optical element can be corrected by another optical element when an optical system is constructed by combining together a plurality of optical elements. However, it is preferable that the amount of chromatic aberrations produced by the optical element should be minimal from the beginning because it would be possible to construct an optical system with a reduced number of optical elements. If the Abbe's number $\nu$ is not larger than the lower limit of the condition (3), i.e. 20, dispersion becomes excessively large. Consequently, aberrations produced by the optical element become excessively large and hence difficult to correct by another surface. Conversely, if the Abbe's number $\nu$ is not smaller than the upper limit, i.e. 65, it becomes difficult to obtain a sufficiently high refractive index. Consequently, aberrations produced by the optical element become excessively large and hence difficult to correct by another surface.

Regarding the refractive index n for the spectral d-line, it is desirable to satisfy the following condition:

$$1.6 < n < 1.9 \qquad (4)$$

If the refractive index n is not larger than the lower limit of the condition (4), i.e. 1.6, the refractive index becomes excessively small. Consequently, spherical and other aberrations produced by the optical element become excessively large and hence difficult to correct by another surface. If the refractive index n is not smaller than the upper limit, i.e. 1.9, dispersion becomes large. Consequently, chromatic aberrations produced by the optical element become excessively large and hence difficult to correct by another surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The following is a description of Examples in which the optical element according to the present invention is applied to an ocular optical system of an image display apparatus.

Figure 1:
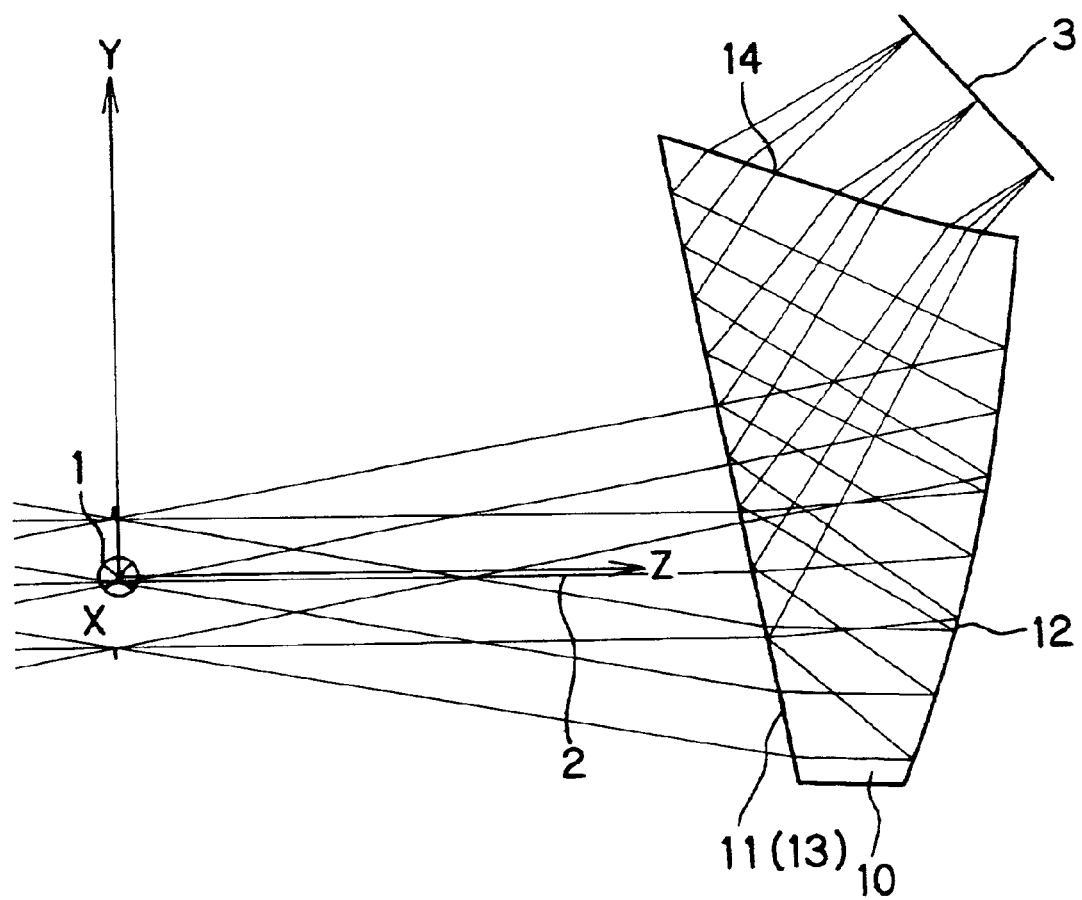
FIG. 1 is a ray path diagram of a decentered prism according to Example 1 of the present invention.

FIG. 1 illustrates a backward ray trace of a decentered prism 10 according to Example 1 as applied to an ocular optical system of an image display apparatus. Examples 2 to 4 are similar to Example 1 in optical arrangement. Therefore, illustration of Examples 2 to 4 is omitted. The decentered prism (ocular prism) 10 has a first surface 11, a second surface 12, a third surface 13, and a fourth surface 14. The first surface 11 and the third surface 13 are formed from a single mutual surface serving as both transmitting and reflecting surfaces. In the backward ray tracing, an axial principal ray (optical axis) 2 from an exit pupil 1 where an observer's pupil is to be positioned enters the decentered prism 10 while being refracted through the first surface 11 thereof. The axial principal ray 2 is internally reflected by the second surface 12 and incident on the third surface 13 at an angle exceeding the critical angle. Consequently, the axial principal ray 2 is totally reflected by the third surface 13 and exits the decentered prism 10 while being refracted through the fourth surface 14. Then, the axial principal ray 2 is incident on an image plane 3 to form a far image. In the image plane 3, an image display device is placed. The first to fourth surfaces 11 to 14 of the decentered prism 10 are arranged in plane symmetry with respect to the YZ-plane, and each surface is two-dimensionally decentered in the YZ-plane.

Figure 2:
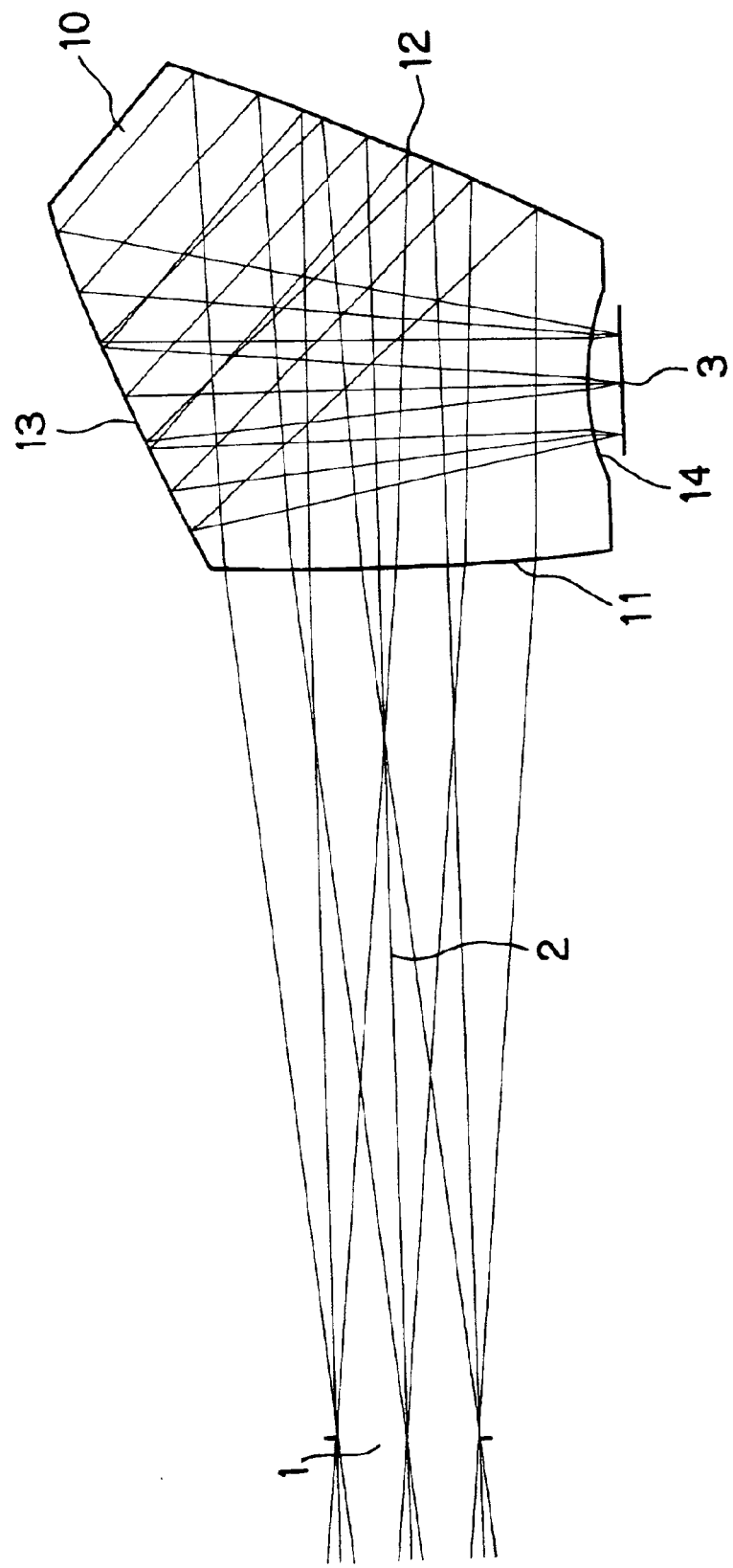
FIG. 2 is a ray path diagram of a decentered prism according to Example 2 of the present invention.

FIG. 2 illustrates a backward ray trace of a decentered prism 10 according to Example 6 as applied to an ocular optical system of an image display apparatus. Examples 7 to 10 are similar to Example 6 in optical arrangement. Therefore, illustration of Examples 7 to 10 is omitted. The decentered prism (ocular prism) 10 has a first surface 11, a second surface 12, a third surface 13, and a fourth surface 14. In the backward ray tracing, an axial principal ray (optical axis) 2 from an exit pupil 1 where an observer's pupil is to be positioned enters the decentered prism 10 while being refracted through the first surface 11 thereof. The axial principal ray 2 is internally reflected by the second surface 12 and further internally reflected by the third surface 13. The reflected optical axis from the third surface 13 crosses the optical axis incident on the second surface 12 within the decentered prism 10. The axial principal ray 2 exits the decentered prism 10 while being refracted through the fourth surface 14. Then, the axial principal ray 2 is incident on an image plane 3 to form a far image. In the image plane 3, an image display device is placed. The first to fourth surfaces 11 to 14 of the decentered prism 10 are arranged in plane symmetry with respect to the YZ-plane, and each surface is two-dimensionally decentered in the YZ-plane.

The image display device 3 used in each of the above-described Examples 1 to 5 has a size of 11.175×8.382 millimeters. The pupil diameter is 12×6 millimeters. Regarding the field angles, the horizontal field angle is 27°, and the vertical field angle is 20.4°.

The image display device 3 used in each of Examples 6 to 10 has a size of 3.86×2.89 millimeters. The pupil diameter is 4 millimeters. Regarding the field angles, the horizontal field angle is 15°, and the vertical field angle is 11.3°.

The refractive index n for the spectral d-line and Abbe's number ν of the organic-inorganic composite material used in each of the following Examples are as follows:

| Examples | Refractive index n | Abbe's number ν |
| --- | --- | --- |
| 1 | 1.7000 | 50.0 |
| 2 | 1.7500 | 28.0 |
| 3 | 1.8000 | 26.0 |
| 4 | 1.6100 | 58.0 |
| 5 | 1.6600 | 57.0 |
| 6 | 1.7000 | 50.0 |
| 7 | 1.7500 | 28.0 |
| 8 | 1.8000 | 26.0 |
| 9 | 1.6100 | 58.0 |
| 10 | 1.6600 | 57.0 |

The material with a refractive index of 1.7000 and an Abbe's number of 50.0 used in Examples is a combination of an oxide glass material having a composition of $60SiO_2$-$40ZrO_2$, which is used as an inorganic component, and a copolymer of an acrylic acid derivative and styrene used as an organic component.

The high-refractive index and high-dispersion material with a refractive index of 1.7500 and an Abbe's number of 28.0 used in Examples is a combination of an oxide glass material having a composition of $20SiO_2$-$80TiO_2$, which is used as an inorganic component, and methyl methacrylate (MMA) used as an organic component.

The high-refractive index and high-dispersion material with a refractive index of 1.8000 and an Abbe's number of 26.0 used in Examples is a combination of an oxide glass material having a composition of $20SiO_2$-$80TiO_2$, which is used as an inorganic component, and methyl methacrylate (MMA) used as an organic component.

The high-refractive index and high-dispersion material with a refractive index of 1.6100 and an Abbe's number of 58.0 used in Examples is a combination of an oxide glass material having a composition of $50SiO_2$-$50ZrO_2$, which is used as an inorganic component, and methyl methacrylate (MMA) used as an organic component.

The high-refractive index and high-dispersion material with a refractive index of 1.6600 and an Abbe's number of 57.0 used in Examples is a combination of an oxide glass material having a composition of $50SiO_2$-$50ZrO_2$, which is used as an inorganic component, and methyl methacrylate (MMA) used as an organic component.

Next, constituent parameters in the above-described Examples 1 to 10 will be shown. In the constituent parameters in each Example, as shown in FIG. 1, the axial principal ray 2 is defined by a light ray passing perpendicularly through the center of the exit pupil 1 of the decentered prism 10 and reaching the center of the image display device (image plane) 3 in the backward ray tracing. Further, in the backward ray tracing, the center of the pupil 1 is defined as the origin of each decentered optical surface constituting a decentered optical system. The direction along which the axial principal ray 2 travels until it intersects the first surface 11 of the decentered prism 10 is defined as a Z-axis. The direction in which the Z-axis extends from the pupil 1 toward the first surface 11 is defined as a positive direction of the Z-axis. A plane in which the optical axis is folded in the decentered prism 10 is defined as a YZ-plane. An axis passing through the origin and perpendicularly intersecting the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. In FIG. 2, illustration of a similar coordinate system is omitted.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the above equation (a) in regard to free-form surfaces; the Z-axis of the following equation (d) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\alpha$ counterclockwise about the Y-axis. Then, the center axis of the surface, which has been rotated twice, is rotated through $\gamma$ clockwise about the Z-axis of the new coordinate system.

Among optical functional surfaces constituting the optical system in each Example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (d)$$

In the above equation, Z is an optical axis (axial principal ray) for which the direction of travel of light is defined as a positive direction, and y is taken in a direction perpendicular to the optical axis. R is a paraxial curvature radius, and K is a conic constant. A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

It should be noted that in the tables showing constituent parameters below, "FFS" denotes a free-form surface, and "ASS" denotes an aspherical surface, and further "RE" denotes a reflecting surface.

EXAMPLE 1

| Surface No. | Radius of curvature | Surface separation and tilt | Displacement | Refractive index | Abbe's No. |
|---|---|---|---|---|---|
| Object plane | ∞ | −1000.00 | | | |
| 1 | ∞ (Pupil) | | | | |
| 2 | ASS(1) | | (1) | 1.7000 | 50.0 |
| 3 | FFS(1) (RE) | | (2) | 1.7000 | 50.0 |
| 4 | ASS(1) (RE) | | (1) | 1.7000 | 50.0 |
| 5 | FFS(2) | | (3) | | |
| Image plane | ∞ | | (4) | | |

ASS(1)

| R | −465.41 |
|---|---|
| K | 0.0000 |
| A | $4.0853 \times 10^{-6}$ |
| B | $-3.6276 \times 10^{-9}$ |

FFS(1)

| $C_4$ | $7.6069 \times 10^{-3}$ | $C_6$ | $-6.4071 \times 10^{-3}$ | $C_8$ | $-2.4575 \times 10^{-5}$ |
| $C_{10}$ | $7.7260 \times 10^{-6}$ | $C_{11}$ | $1.1304 \times 10^{-6}$ | $C_{13}$ | $3.2477 \times 10^{-6}$ |
| $C_{15}$ | $3.1345 \times 10^{-6}$ | $C_{17}$ | $-1.3022 \times 10^{-9}$ | $C_{19}$ | $6.2515 \times 10^{-8}$ |
| $C_{21}$ | $2.7325 \times 10^{-8}$ | | | | |

FFS(2)

| $C_4$ | $1.0956 \times 10^{-2}$ | $C_6$ | $5.4778 \times 10^{-3}$ | $C_8$ | $2.0113 \times 10^{-4}$ |
| $C_{10}$ | $-5.6539 \times 10^{-4}$ | $C_{11}$ | $-5.6010 \times 10^{-5}$ | $C_{13}$ | $-1.2711 \times 10^{-4}$ |
| $C_{15}$ | $1.1657 \times 10^{-5}$ | $C_{17}$ | $4.3938 \times 10^{-6}$ | $C_{19}$ | $5.7444 \times 10^{-6}$ |

Displacement and tilt(1)

| X | 0.00 | Y | 7.89 | Z | 28.00 |
| $\alpha$ | 11.37 | $\beta$ | 0.00 | $\gamma$ | 0.00 |

Displacement and tilt(2)

| X | 0.00 | Y | 0.80 | Z | 39.72 |
| $\alpha$ | −13.35 | $\beta$ | 0.00 | $\gamma$ | 0.00 |

Displacement and tilt(3)

| X | 0.00 | Y | 17.12 | Z | 34.73 |
| $\alpha$ | 72.98 | $\beta$ | 0.00 | $\gamma$ | 0.00 |

Displacement and tilt(4)

| X | 0.00 | Y | 21.58 | Z | 40.18 |
| $\alpha$ | 43.11 | $\beta$ | 0.00 | $\gamma$ | 0.00 |

EXAMPLE 2

| Surface No. | Radius of curvature | Surface separation and tilt | Displacement | Refractive index | Abbe's No. |
|---|---|---|---|---|---|
| Object plane | ∞ | −1000.00 | | | |
| 1 | ∞ (Pupil) | | | | |
| 2 | ASS(1) | | (1) | 1.7500 | 28.0 |
| 3 | FFS(1) (RE) | | (2) | 1.7500 | 28.0 |
| 4 | ASS(1) (RE) | | (1) | 1.7500 | 28.0 |
| 5 | FFS(2) | | (3) | | |

| | | | |
|---|---|---|---|
| Image plane | ∞ | (4) | |

ASS①

| | |
|---|---|
| R | −81.65 |
| K | 0.0000 |
| A | $2.8023 \times 10^{-7}$ |
| B | $-1.4916 \times 10^{-9}$ |

FFS①

| | | | | | |
|---|---|---|---|---|---|
| $C_4$ | $-1.1097 \times 10^{-2}$ | $C_6$ | $-1.0696 \times 10^{-2}$ | $C_8$ | $2.0883 \times 10^{-6}$ |
| $C_{10}$ | $2.6469 \times 10^{-5}$ | $C_{11}$ | $-1.1567 \times 10^{-6}$ | $C_{13}$ | $-1.6527 \times 10^{-6}$ |
| $C_{15}$ | $-6.5206 \times 10^{-7}$ | $C_{17}$ | $5.9846 \times 10^{-8}$ | $C_{19}$ | $8.2428 \times 10^{-8}$ |
| $C_{21}$ | $1.5314 \times 10^{-7}$ | | | | |

FFS②

| | | | | | |
|---|---|---|---|---|---|
| $C_4$ | $1.6898 \times 10^{-2}$ | $C_6$ | $4.6252 \times 10^{-4}$ | $C_8$ | $6.6109 \times 10^{-5}$ |
| $C_{10}$ | $1.9893 \times 10^{-4}$ | $C_{11}$ | $-5.3233 \times 10^{-5}$ | $C_{13}$ | $-1.7008 \times 10^{-4}$ |
| $C_{15}$ | $-1.1814 \times 10^{-4}$ | $C_{17}$ | $1.5339 \times 10^{-7}$ | $C_{19}$ | $1.1033 \times 10^{-5}$ |

Displacement and tilt(1)

| X | 0.00 | Y | 6.52 | Z | 28.00 |
|---|---|---|---|---|---|
| α | 12.03 | β | 0.00 | γ | 0.00 |

Displacement and tilt(2)

| X | 0.00 | Y | 0.49 | Z | 37.87 |
|---|---|---|---|---|---|
| α | −14.14 | β | 0.00 | γ | 0.00 |

Displacement and tilt(3)

| X | 0.00 | Y | 13.51 | Z | 32.80 |
|---|---|---|---|---|---|
| α | 67.68 | β | 0.00 | γ | 0.00 |

Displacement and tilt(4)

| X | 0.00 | Y | 19.30 | Z | 38.39 |
|---|---|---|---|---|---|
| α | 53.65 | β | 0.00 | γ | 0.00 |

EXAMPLE 3

| Surface No. | Radius of curvature | Surface separation and tilt | Refractive index | Abbe's No. |
|---|---|---|---|---|
| Object plane | ∞ | −1000.00 | | |
| 1 | ∞ (Pupil) | | | |
| 2 | ASS① | (1) | 1.8000 | 26.0 |
| 3 | FFS① (RE) | (2) | 1.8000 | 26.0 |
| 4 | ASS① (RE) | (1) | 1.8000 | 26.0 |
| 5 | FFS② | (3) | | |
| Image plane | ∞ | (4) | | |

ASS①

| | |
|---|---|
| R | −81.84 |
| K | 0.0000 |
| A | $-2.2216 \times 10^{-8}$ |
| B | $-1.4778 \times 10^{-9}$ |

FFS①

| | | | | | |
|---|---|---|---|---|---|
| $C_4$ | $-1.0894 \times 10^{-2}$ | $C_6$ | $-1.0539 \times 10^{-2}$ | $C_8$ | $4.7143 \times 10^{-6}$ |
| $C_{10}$ | $2.5174 \times 10^{-5}$ | $C_{11}$ | $-1.1313 \times 10^{-6}$ | $C_{13}$ | $-1.7918 \times 10^{-6}$ |
| $C_{15}$ | $-6.9200 \times 10^{-7}$ | $C_{17}$ | $6.0539 \times 10^{-8}$ | $C_{19}$ | $7.5796 \times 10^{-8}$ |
| $C_{21}$ | $1.3715 \times 10^{-7}$ | | | | |

FFS②

| | | | | | |
|---|---|---|---|---|---|
| $C_4$ | $1.5495 \times 10^{-2}$ | $C_6$ | $2.8410 \times 10^{-4}$ | $C_8$ | $4.0404 \times 10^{-5}$ |
| $C_{10}$ | $1.9907 \times 10^{-4}$ | $C_{11}$ | $-5.3853 \times 10^{-5}$ | $C_{13}$ | $-1.5370 \times 10^{-4}$ |
| $C_{15}$ | $-1.1465 \times 10^{-4}$ | $C_{17}$ | $1.1444 \times 10^{-7}$ | $C_{19}$ | $1.0011 \times 10^{-5}$ |

Displacement and tilt(1)

| X | 0.00 | Y | 6.58 | Z | 28.00 |
|---|---|---|---|---|---|
| α | 11.51 | β | 0.00 | γ | 0.00 |

Displacement and tilt(2)

| X | 0.00 | Y | 0.48 | Z | 38.17 |
|---|---|---|---|---|---|
| α | −13.94 | β | 0.00 | γ | 0.00 |

Displacement and tilt(3)

| X | 0.00 | Y | 13.76 | Z | 33.23 |
|---|---|---|---|---|---|
| α | 65.07 | β | 0.00 | γ | 0.00 |

Displacement and tilt(4)

| X | 0.00 | Y | 19.41 | Z | 38.93 |
|---|---|---|---|---|---|
| α | 52.42 | β | 0.00 | γ | 0.00 |

EXAMPLE 4

| Surface No. | Radius of curvature | Surface separation and tilt | Refractive index | Abbe's No. |
|---|---|---|---|---|
| Object plane | ∞ | −1000.00 | | |
| 1 | ∞ (Pupil) | | | |
| 2 | ASS① | (1) | 1.6100 | 58.0 |
| 3 | FFS① | (2) | 1.6100 | 58.0 |
| 4 | ASS① | (1) | 1.6100 | 58.0 |
| 5 | FFS② | (3) | | |
| Image plane | ∞ | (4) | | |

ASS①

| | |
|---|---|
| R | −613.30 |
| K | 0.0000 |
| A | $3.8194 \times 10^{-6}$ |
| B | $-3.3900 \times 10^{-9}$ |

FFS①

| | | | | | |
|---|---|---|---|---|---|
| $C_4$ | $-7.7195 \times 10^{-3}$ | $C_6$ | $-6.3894 \times 10^{-3}$ | $C_8$ | $-2.1002 \times 10^{-5}$ |
| $C_{10}$ | $1.7336 \times 10^{-5}$ | $C_{11}$ | $1.0822 \times 10^{-6}$ | $C_{13}$ | $3.3385 \times 10^{-6}$ |
| $C_{15}$ | $3.9178 \times 10^{-6}$ | $C_{17}$ | $3.1296 \times 10^{-9}$ | $C_{19}$ | $6.8395 \times 10^{-8}$ |
| $C_{21}$ | $1.8118 \times 10^{-8}$ | | | | |

FFS②

| | | | | | |
|---|---|---|---|---|---|
| $C_4$ | $9.7740 \times 10^{-3}$ | $C_6$ | $5.5490 \times 10^{-3}$ | $C_8$ | $2.0291 \times 10^{-4}$ |
| $C_{10}$ | $-7.1899 \times 10^{-4}$ | $C_{11}$ | $-5.8003 \times 10^{-5}$ | $C_{13}$ | $-1.2416 \times 10^{-4}$ |
| $C_{15}$ | $2.2286 \times 10^{-5}$ | $C_{17}$ | $4.7006 \times 10^{-6}$ | $C_{19}$ | $5.6814 \times 10^{-6}$ |

Displacement and tilt(1)

| X | 0.00 | Y | 7.61 | Z | 28.00 |
|---|---|---|---|---|---|
| α | 13.24 | β | 0.00 | γ | 0.00 |

Displacement and tilt(2)

| X | 0.00 | Y | 0.81 | Z | 39.18 |
|---|---|---|---|---|---|
| α | −13.18 | β | 0.00 | γ | 0.00 |

Displacement and tilt(3)

| X | 0.00 | Y | 16.88 | Z | 33.84 |
|---|---|---|---|---|---|
| α | 79.81 | β | 0.00 | γ | 0.00 |

Displacement and tilt(4)

| X | 0.00 | Y | 21.80 | Z | 39.19 |
|---|---|---|---|---|---|
| α | 45.92 | β | 0.00 | γ | 0.00 |

EXAMPLE 5

| Surface No. | Radius of curvature | Surface separation and tilt | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.6600 | 57.0 |
| 3 | FFS① (RE) | | (2) | 1.6600 | 57.0 |
| 4 | ASS① (RE) | | (1) | 1.6600 | 57.0 |
| 5 | FFS② | | (3) | | |
| Image plane | ∞ | | (4) | | |

ASS①

| R | −559.70 |
|---|---|
| K | 0.0000 |
| A | $4.0256 \times 10^{-6}$ |
| B | $-3.6632 \times 10^{-9}$ |

FFS①

$C_4$ $-7.5633 \times 10^{-3}$  $C_6$ $-6.3370 \times 10^{-3}$  $C_8$ $-2.2100 \times 10^{-5}$
$C_{10}$ $1.1349 \times 10^{-5}$  $C_{11}$ $1.1547 \times 10^{-6}$  $C_{13}$ $3.3699 \times 10^{-6}$
$C_{15}$ $3.3630 \times 10^{-6}$  $C_{17}$ $5.9839 \times 10^{-10}$  $C_{19}$ $7.4791 \times 10^{-8}$
$C_{21}$ $2.9286 \times 10^{-8}$

FFS②

$C_4$ $9.8562 \times 10^{-3}$  $C_6$ $5.1616 \times 10^{-3}$  $C_8$ $1.9420 \times 10^{-4}$
$C_{10}$ $-6.0917 \times 10^{-4}$  $C_{11}$ $-5.5811 \times 10^{-5}$  $C_{13}$ $-1.2496 \times 10^{-4}$
$C_{15}$ $1.5670 \times 10^{-5}$  $C_{17}$ $4.5200 \times 10^{-6}$  $C_{19}$ $5.6722 \times 10^{-6}$

Displacement and tilt(1)

| X | 0.00 | Y | 7.70 | Z | 28.00 |
|---|---|---|---|---|---|
| α | 11.77 | β | 0.00 | γ | 0.00 |

Displacement and tilt(2)

| X | 0.00 | Y | 0.81 | Z | 39.69 |
|---|---|---|---|---|---|
| α | −12.99 | β | 0.00 | γ | 0.00 |

Displacement and tilt(3)

| X | 0.00 | Y | 16.76 | Z | 34.57 |
|---|---|---|---|---|---|
| α | 74.17 | β | 0.00 | γ | 0.00 |

Displacement and tilt(4)

| X | 0.00 | Y | 21.31 | Z | 40.10 |
|---|---|---|---|---|---|
| α | 43.07 | β | 0.00 | γ | 0.00 |

EXAMPLE 6

| Surface No. | Radius of curvature | Surface separation and tilt | Displacement and tilt | Refractive index | Abbe's No. |
|---|---|---|---|---|---|
| Object plane | ∞ | −1000.00 | | | |
| 1 | ∞ (Pupil) | | | | |
| 2 | 73.91 | | (1) | 1.7000 | 50.0 |
| 3 | FFS① (RE) | | (2) | 1.7000 | 50.0 |
| 4 | FFS② (RE) | | (3) | 1.7000 | 50.0 |
| 5 | FFS③ | | (4) | | |
| Image plane | ∞ | | (5) | | |

FFS①

$C_4$ $-6.2172 \times 10^{-3}$  $C_6$ $-4.7426 \times 10^{-3}$  $C_8$ $-1.2712 \times 10^{-4}$
$C_{10}$ $4.0918 \times 10^{-5}$  $C_{11}$ $3.7858 \times 10^{-6}$  $C_{13}$ $9.6287 \times 10^{-7}$
$C_{15}$ $2.7753 \times 10^{-6}$

FFS②

$C_4$ $5.0000 \times 10^{-3}$  $C_6$ $5.0000 \times 10^{-3}$  $C_8$ $-3.5344 \times 10^{-4}$
$C_{10}$ $-1.0337 \times 10^{-5}$  $C_{11}$ $8.9738 \times 10^{-6}$  $C_{13}$ $1.1110 \times 10^{-5}$
$C_{15}$ $3.5548 \times 10^{-6}$

FFS③

$C_4$ $6.1734 \times 10^{-2}$  $C_6$ $7.6714 \times 10^{-2}$  $C_8$ $-1.7652 \times 10^{-2}$

Displacement and tilt(1)

| X | 0.00 | Y | 0.00 | Z | 25.00 |
|---|---|---|---|---|---|
| α | 0.00 | β | 0.00 | γ | 0.00 |

Displacement and tilt(2)

| X | 0.00 | Y | 0.00 | Z | 37.00 |
|---|---|---|---|---|---|
| α | −22.50 | β | 0.00 | γ | 0.00 |

Displacement and tilt(3)

| X | 0.00 | Y | 7.00 | Z | 30.00 |
|---|---|---|---|---|---|
| α | −67.50 | β | 0.00 | γ | 0.00 |

Displacement and tilt(4)

| X | 0.00 | Y | −6.00 | Z | 30.00 |
|---|---|---|---|---|---|
| α | −90.00 | β | 0.00 | γ | 0.00 |

Displacement and tilt(5)

| X | 0.00 | Y | −7.00 | Z | 30.00 |
|---|---|---|---|---|---|
| α | −90.00 | β | 0.00 | γ | 0.00 |

EXAMPLE 7

| Surface No. | Radius of curvature | Surface separation and tilt | Displacement and tilt | Refractive index | Abbe's No. |
|---|---|---|---|---|---|
| Object plane | ∞ | −1000.00 | | | |
| 1 | ∞ (Pupil) | | | | |
| 2 | 68.97 | | (1) | 1.7500 | 28.0 |
| 3 | FFS① (RE) | | (2) | 1.7500 | 28.0 |
| 4 | FFS② (RE) | | (3) | 1.7500 | 28.0 |
| 5 | FFS③ | | (4) | | |
| Image plane | ∞ | | (5) | | |

FFS①

$C_4$ $-6.0690 \times 10^{-3}$  $C_6$ $-4.6443 \times 10^{-3}$  $C_8$ $-8.9169 \times 10^{-5}$
$C_{10}$ $4.2877 \times 10^{-5}$  $C_{11}$ $4.8421 \times 10^{-6}$  $C_{13}$ $2.4224 \times 10^{-6}$
$C_{15}$ $3.6222 \times 10^{-6}$

FFS②

$C_4$ $5.0000 \times 10^{-3}$  $C_6$ $5.0000 \times 10^{-3}$  $C_8$ $-2.6778 \times 10^{-4}$
$C_{10}$ $-3.6167 \times 10^{-6}$  $C_{11}$ $1.1024 \times 10^{-5}$  $C_{13}$ $9.9688 \times 10^{-6}$
$C_{15}$ $4.0581 \times 10^{-6}$

FFS③

$C_4$ $9.1843 \times 10^{-2}$  $C_6$ $1.0747 \times 10^{-1}$  $C_8$ $-1.3970 \times 10^{-2}$

Displacement and tilt(1)

| X | 0.00 | Y | 0.00 | Z | 25.00 |
|---|---|---|---|---|---|
| α | 0.00 | β | 0.00 | γ | 0.00 |

Displacement and tilt(2)

| X | 0.00 | Y | 0.00 | Z | 37.00 |
|---|---|---|---|---|---|
| α | −22.50 | β | 0.00 | γ | 0.00 |

Displacement and tilt(3)

| X | 0.00 | Y | 7.00 | Z | 30.00 |
|---|---|---|---|---|---|
| α | −67.50 | β | 0.00 | γ | 0.00 |

Displacement and tilt(4)

| X | 0.00 | Y | −6.00 | Z | 30.00 |
|---|---|---|---|---|---|
| α | −90.00 | β | 0.00 | γ | 0.00 |

EXAMPLE 8

| Surface No. Object plane | Radius of curvature | Surface separation and tilt | Displacement and tilt | Refractive index | Abbe's No. |
|---|---|---|---|---|---|
| | ∞ | −1000.00 | | | |
| 1 | ∞ (Pupil) | | | | |
| 2 | 61.78 | | (1) | 1.8000 | 26.0 |
| 3 | FFS①(RE) | | (2) | 1.8000 | 26.0 |
| 4 | FFS②(RE) | | (3) | 1.8000 | 26.0 |
| 5 | FFS③ | | (4) | | |
| Image plane | ∞ | | (5) | | |

FFS①
$C_4$ −5.8639 × 10$^{-3}$  $C_6$ −4.4965 × 10$^{-3}$  $C_8$ −8.4296 × 10$^{-5}$
$C_{10}$ 3.8766 × 10$^{-5}$  $C_{11}$ 5.3996 × 10$^{-6}$  $C_{13}$ 2.9919 × 10$^{-6}$
$C_{15}$ 3.8421 × 10$^{-6}$

FFS②
$C_4$ 5.0000 × 10$^{-3}$  $C_6$ 5.0000 × 10$^{-3}$  $C_8$ −2.5338 × 10$^{-4}$
$C_{10}$ −4.6435 × 10$^{-6}$  $C_{11}$ 1.1924 × 10$^{-5}$  $C_{13}$ 9.7497 × 10$^{-6}$
$C_{15}$ 4.2653 × 10$^{-6}$

FFS③
$C_4$ 9.9089 × 10$^{-2}$  $C_6$ 1.1211 × 10$^{-1}$  $C_8$ −1.2332 × 10$^{-2}$

Displacement and tilt(1)
| X | 0.00 | Y | 0.00 | Z | 25.00 |
| α | 0.00 | β | 0.00 | γ | 0.00 |

Displacement and tilt(2)
| X | 0.00 | Y | 0.00 | Z | 37.00 |
| α | −22.50 | β | 0.00 | γ | 0.00 |

Displacement and tilt(3)
| X | 0.00 | Y | 7.00 | Z | 30.00 |
| α | −67.50 | β | 0.00 | γ | 0.00 |

Displacement and tilt(4)
| X | 0.00 | Y | −6.00 | Z | 30.00 |
| α | −90.00 | β | 0.00 | γ | 0.00 |

Displacement and tilt(5)
| X | 0.00 | Y | −7.00 | Z | 30.00 |
| α | −90.00 | β | 0.00 | γ | 0.00 |

EXAMPLE 9

| Surface No. Object plane | Radius of curvature | Surface separation and tilt | Displacement and tilt | Refractive index | Abbe's No. |
|---|---|---|---|---|---|
| | ∞ | −1000.00 | | | |
| 1 | ∞ (Pupil) | | | | |
| 2 | 118.65 | | (1) | 1.6100 | 58.0 |
| 3 | FFS①(RE) | | (2) | 1.6100 | 58.0 |
| 4 | FFS②(RE) | | (3) | 1.6100 | 58.0 |
| 5 | FFS③ | | (4) | | |
| Image plane | ∞ | | (5) | | |

FFS①
$C_4$ −6.7419 × 10$^{-3}$  $C_6$ −5.1355 × 10$^{-3}$  $C_8$ −1.3212 × 10$^{-4}$
$C_{10}$ 4.3655 × 10$^{-5}$  $C_{11}$ 2.9834 × 10$^{-6}$  $C_{13}$ −1.1392 × 10$^{-7}$
$C_{15}$ 2.2629 × 10$^{-6}$

FFS②
$C_4$ 5.0000 × 10$^{-3}$  $C_6$ 5.0000 × 10$^{-3}$  $C_8$ −3.6829 × 10$^{-4}$
$C_{10}$ −1.8179 × 10$^{-5}$  $C_{11}$ 7.2754 × 10$^{-6}$  $C_{13}$ 9.7538 × 10$^{-6}$
$C_{15}$ 3.0759 × 10$^{-6}$

FFS③
$C_4$ 5.4910 × 10$^{-2}$  $C_6$ 7.4861 × 10$^{-2}$  $C_8$ −2.0325 × 10$^{-2}$

Displacement and tilt(1)
| X | 0.00 | Y | 0.00 | Z | 25.00 |
| α | 0.00 | β | 0.00 | γ | 0.00 |

Displacement and tilt(2)
| X | 0.00 | Y | 0.00 | Z | 37.00 |
| α | −22.50 | β | 0.00 | γ | 0.00 |

Displacement and tilt(3)
| X | 0.00 | Y | 7.00 | Z | 30.00 |
| α | −67.50 | β | 0.00 | γ | 0.00 |

Displacement and tilt(4)
| X | 0.00 | Y | −6.00 | Z | 30.00 |
| α | −90.00 | β | 0.00 | γ | 0.00 |

Displacement and tilt(5)
| X | 0.00 | Y | −7.00 | Z | 30.00 |
| α | −90.00 | β | 0.00 | γ | 0.00 |

EXAMPLE 10

| Surface No. Object plane | Radius of curvature | Surface separation and tilt | Displacement and tilt | Refractive index | Abbe's No. |
|---|---|---|---|---|---|
| | ∞ | −1000.00 | | | |
| 1 | ∞ (Pupil) | | | | |
| 2 | 86.52 | | (1) | 1.6600 | 57.0 |
| 3 | FFS①(RE) | | (2) | 1.6600 | 57.0 |
| 4 | FFS②(RE) | | (3) | 1.6600 | 57.0 |
| 5 | FFS③ | | (4) | | |
| Image plane | ∞ | | (5) | | |

FFS①
$C_4$ −6.4435 × 10$^{-3}$  $C_6$ −4.9132 × 10$^{-3}$  $C_8$ −1.3254 × 10$^{-4}$
$C_{10}$ 4.0742 × 10$^{-5}$  $C_{11}$ 3.3836 × 10$^{-6}$  $C_{13}$ 3.7727 × 10$^{-7}$
$C_{15}$ 2.4738 × 10$^{-6}$

FFS②
$C_4$ 5.0000 × 10$^{-3}$  $C_6$ 5.0000 × 10$^{-3}$  $C_8$ −3.6682 × 10$^{-4}$
$C_{10}$ −1.5594 × 10$^{-5}$  $C_{11}$ 8.1108 × 10$^{-6}$  $C_{13}$ 1.0536 × 10$^{-5}$
$C_{15}$ 3.3354 × 10$^{-6}$

FFS③
$C_4$ 5.6393 × 10$^{-2}$  $C_6$ 7.2998 × 10$^{-2}$  $C_8$ −1.8806 × 10$^{-2}$

Displacement and tilt(1)
| X | 0.00 | Y | 0.00 | Z | 25.00 |
| α | 0.00 | β | 0.00 | γ | 0.00 |

-continued

| Displacement and tilt(2) | | | | | |
|---|---|---|---|---|---|
| X | 0.00 | Y | 0.00 | Z | 37.00 |
| α | −22.50 | β | 0.00 | γ | 0.00 |
| Displacement and tilt(3) | | | | | |
| X | 0.00 | Y | 7.00 | Z | 30.00 |
| α | −67.50 | β | 0.00 | γ | 0.00 |
| Displacement and tilt(4) | | | | | |
| X | 0.00 | Y | −6.00 | Z | 30.00 |
| α | −90.00 | β | 0.00 | γ | 0.00 |
| Displacement and tilt(5) | | | | | |
| X | 0.00 | Y | −7.00 | Z | 30.00 |
| α | −90.00 | β | 0.00 | γ | 0.00 |

Figure 3:
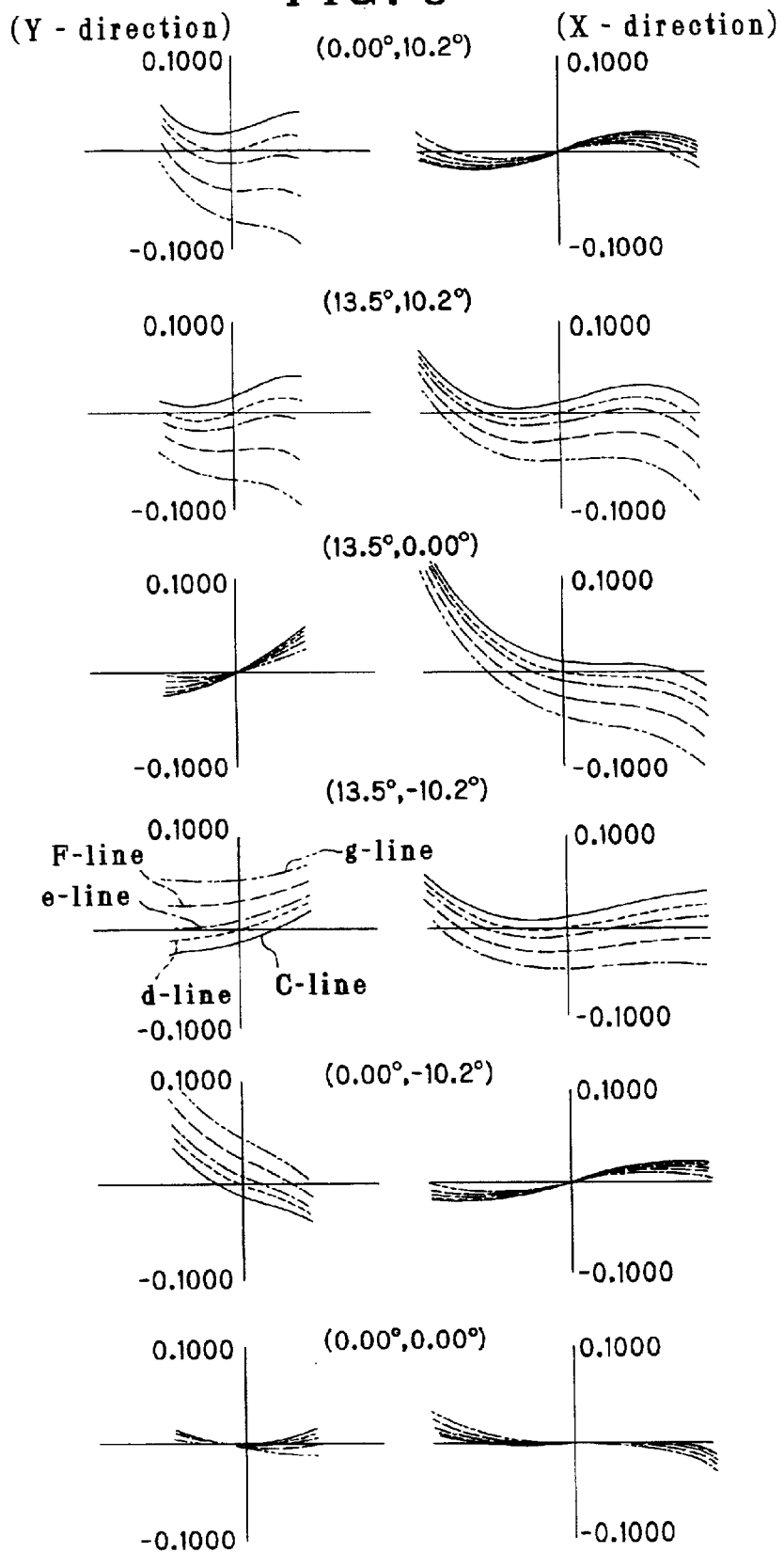
FIG. 3 is an aberrational diagram showing lateral aberrations in Example 1.
Figure 4:
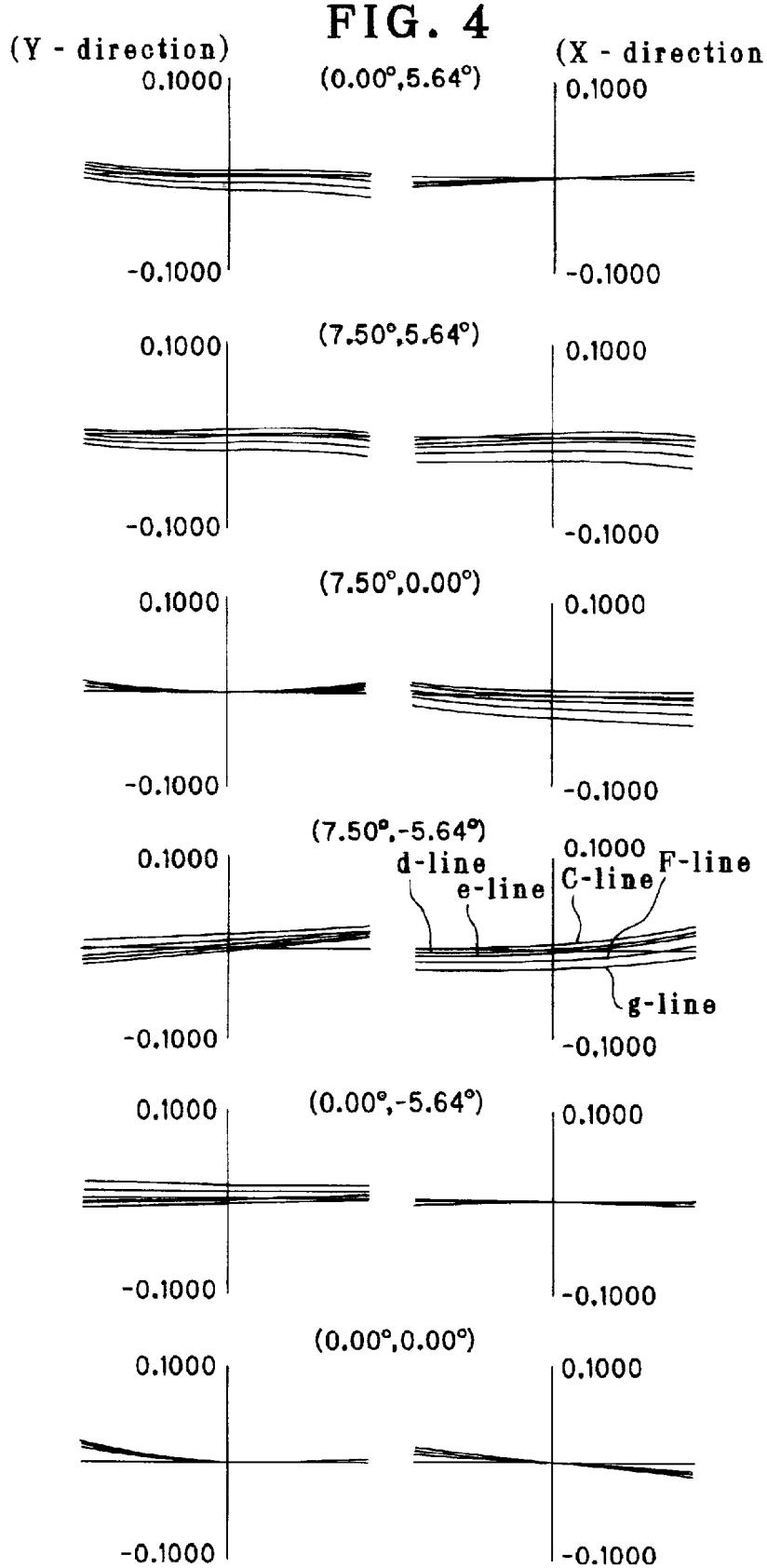
FIG. 4 is an aberrational diagram showing lateral aberrations in Example 6.
Figure 5:
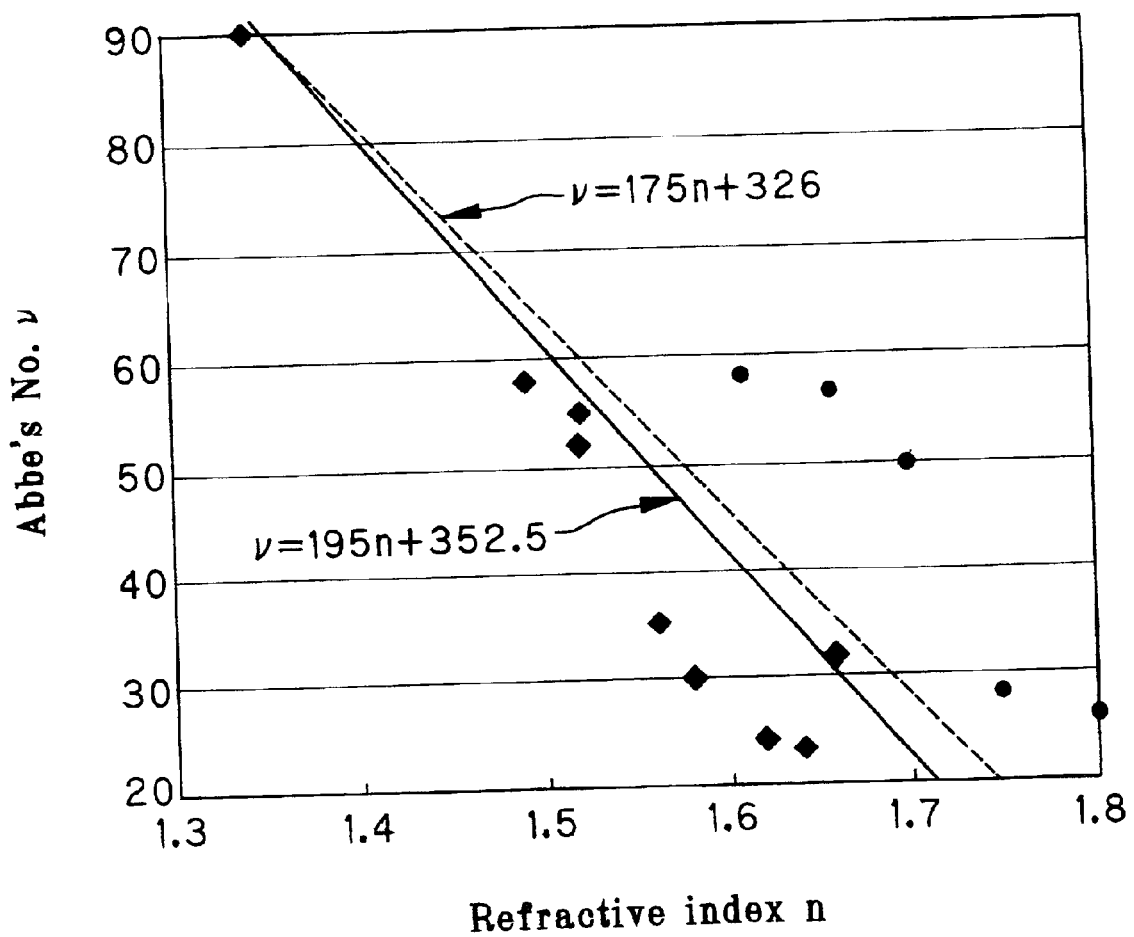
FIG. 5 is a diagram showing the relationship between the refractive index n for the spectral d-line and Abbe's number $\nu$ of existing plastic materials and organic-inorganic composite materials used in Examples of the present invention.

FIGS. 3 and 4 are aberrational diagrams showing lateral aberrations in the above-described Examples 1 and 6, respectively. In the diagrams showing lateral aberrations, the numerals in the parentheses denote (horizontal field angle, vertical field angle), and lateral aberrations at the field angles are shown.

Incidentally, the decentered prism 10 as an optical element to which the above-described organic-inorganic composite material is applicable is not necessarily limited to the type of prism used in the foregoing Examples, in which there are two internal reflections. The organic-inorganic composite material according to the present invention is applicable to various decentered prisms. Some examples of such decentered prisms are shown in FIGS. 6 to 13. It should be noted that each prism will be described as an image-forming optical system used in an image pickup optical system, by way of example. However, it is a matter of course that each prism is also usable as an ocular optical system as shown in Examples 1 to 10.

Figure 6:
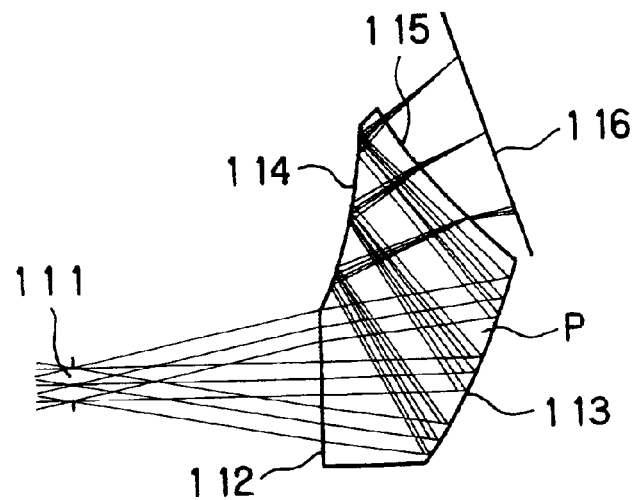
FIG. 6 is a diagram showing one example of decentered prisms to which an organic-inorganic composite material according to the present invention is applicable.

In the case of FIG. 6, a prism P has a first surface 112, a second surface 113, a third surface 114, and a fourth surface 115. Incident light passing through a pupil 111 enters the prism P while being refracted through the first surface 112. The incident light is internally reflected by the second surface 113 and further internally reflected by the third surface 114. The reflected light is refracted by the fourth surface 115 to form an image on an image plane 116.

Figure 7:
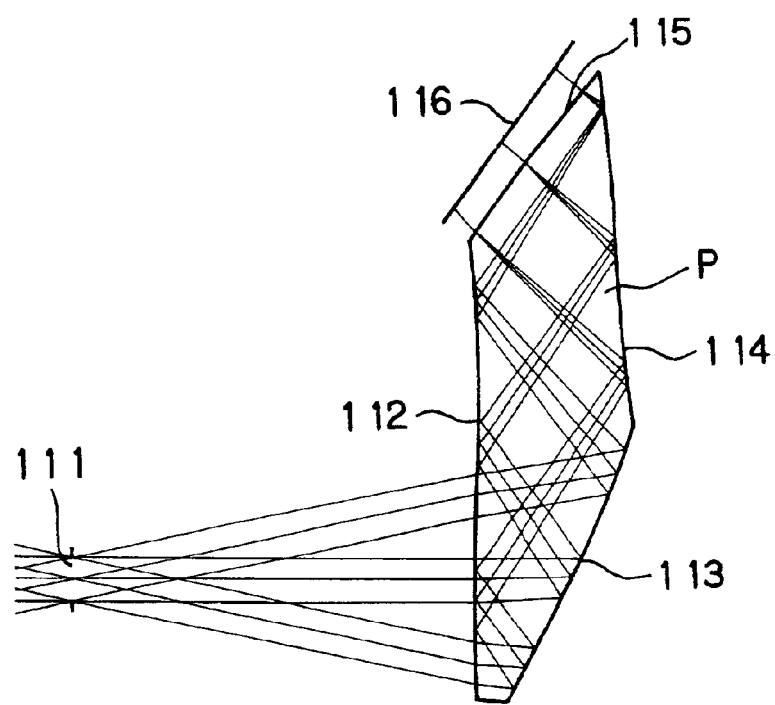
FIG. 7 is a diagram showing another example of decentered prisms to which an organic-inorganic composite material according to the present invention is applicable.

In the case of FIG. 7, a prism P has a first surface 112, a second surface 113, a third surface 114, and a fourth surface 115. Incident light passing through a pupil 111 enters the prism P while being refracted through the first surface 112. The incident light is internally reflected by the second surface 113 and then totally reflected by the first surface 112. The reflected light is internally reflected by the third surface 114 and then refracted by the fourth surface 115 to form an image on an image plane 116.

Figure 8:
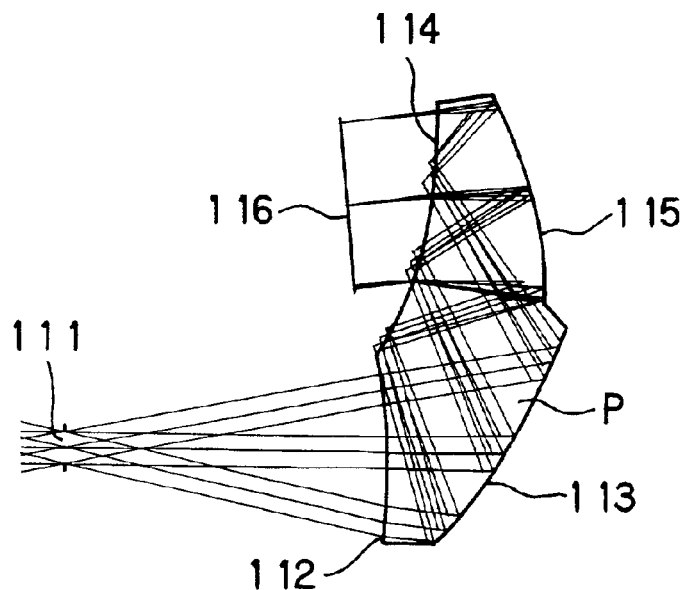
FIG. 8 is a diagram showing another example of decentered prisms to which an organic-inorganic composite material according to the present invention is applicable.

In the case of FIG. 8, a prism P has a first surface 112, a second surface 113, a third surface 114, and a fourth surface 115. Incident light passing through a pupil 111 enters the prism P while being refracted through the first surface 112. The incident light is internally reflected by the second surface 113 and then totally reflected by the third surface 114. The reflected light is internally reflected by the fourth surface 115 and then refracted by the third surface 114 to form an image on an image plane 116.

Figure 9:
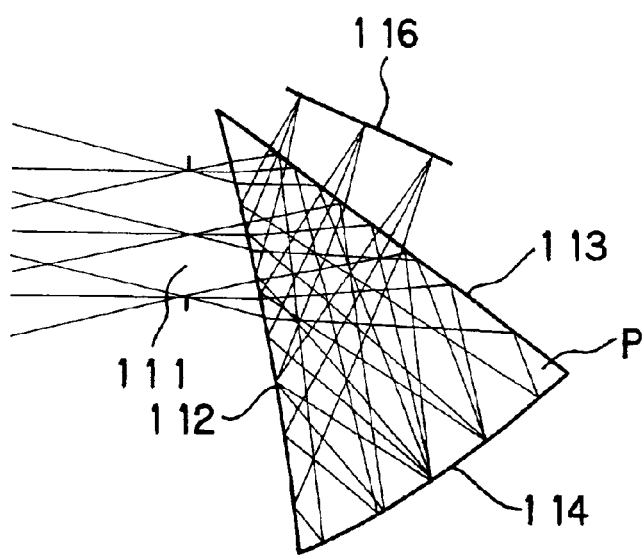
FIG. 9 is a diagram showing another example of decentered prisms to which an organic-inorganic composite material according to the present invention is applicable.

In the case of FIG. 9, a prism P has a first surface 112, a second surface 113, and a third surface 114. Incident light passing through a pupil 111 enters the prism P while being refracted through the first surface 112. The incident light is internally reflected by the second surface 113 and further internally reflected by the third surface 114. The reflected light is totally reflected by the first surface 112 and then refracted by the second surface 113 to form an image on an image plane 116.

Figure 10:
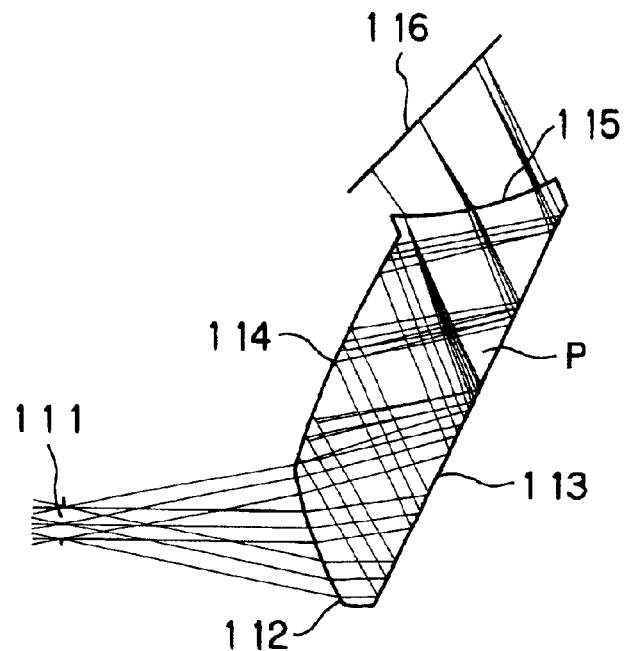
FIG. 10 is a diagram showing another example of decentered prisms to which an organic-inorganic composite material according to the present invention is applicable.

In the case of FIG. 10, a prism P has a first surface 112, a second surface 113, a third surface 114, and a fourth surface 115. Incident light passing through a pupil 111 enters the prism P while being refracted through the first surface 112. The incident light is internally reflected by the second surface 113 and further internally reflected by the third surface 114. The reflected light is further internally reflected by the second surface 113 and then refracted by the fourth surface 115 to form an image on an image plane 116.

Figure 11:
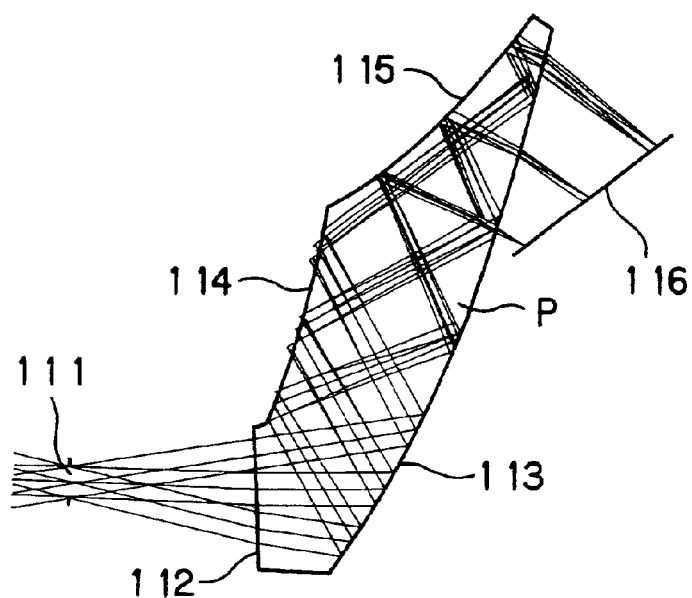
FIG. 11 is a diagram showing another example of decentered prisms to which an organic-inorganic composite material according to the present invention is applicable.

In the case of FIG. 11, a prism P has a first surface 112, a second surface 113, a third surface 114, and a fourth surface 115. Incident light passing through a pupil 111 enters the prism P while being refracted through the first surface 112. The incident light is internally reflected by the second surface 113 and further internally reflected by the third surface 114. The reflected light is further internally reflected by the second surface 113 and then internally reflected by the fourth surface 115. The reflected light is then refracted by the second surface 113 to form an image on an image plane 116.

Figure 12:
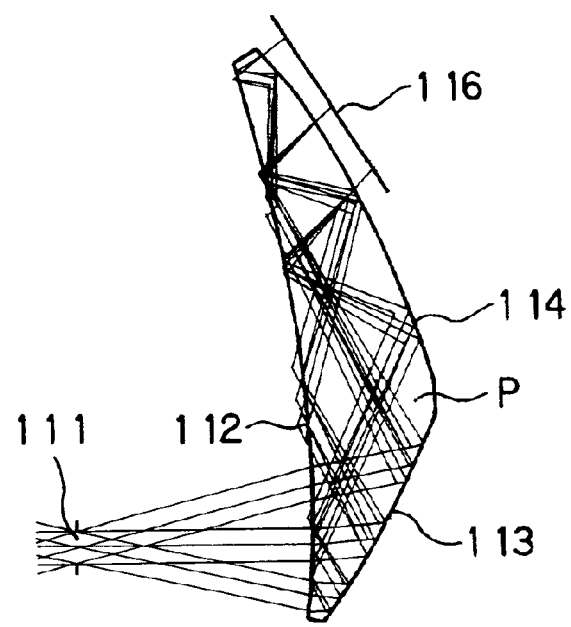
FIG. 12 is a diagram showing another example of decentered prisms to which an organic-inorganic composite material according to the present invention is applicable.

In the case of FIG. 12, a prism P has a first surface 112, a second surface 113, and a third surface 114. Incident light passing through a pupil 111 enters the prism P while being refracted through the first surface 112. The incident light is internally reflected by the second surface 113 and then totally reflected by the first surface 112. The reflected light is internally reflected by the third surface 114 and then totally reflected by the first surface 112. Then, the reflected light is refracted by the third surface 114 to form an image on an image plane 116.

Figure 13:
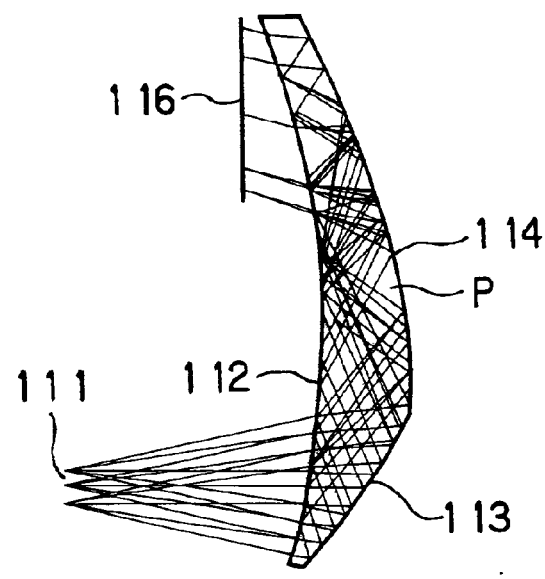
FIG. 13 is a diagram showing another example of decentered prisms to which an organic-inorganic composite material according to the present invention is applicable.

In the case of FIG. 13, a prism P has a first surface 112, a second surface 113, and a third surface 114. Incident light passing through a pupil 111 enters the prism P while being refracted through the first surface 112. The incident light is internally reflected by the second surface 113 and then totally reflected by the first surface 112. The reflected light is internally reflected by the third surface 114 and then totally reflected by the first surface 112. The reflected light is internally reflected by the third surface 114 and then refracted by the first surface 112 to form an image on an image plane 116.

The decentered prisms 10 and P shown in FIGS. 1, 2 and 6 to 13 may be used alone as a single unit. Alternatively, two or more of the decentered prisms 10 and P may be used in combination to form an optical system. It is possible to construct an optical system of the type in which an intermediate image is formed once, or an optical system of the type in which no intermediate image is formed, or an optical system of the type in which an intermediate image is formed two or more times.

As will be clear from the foregoing description, it is possible according to the present invention to provide a lightweight and homogeneous optical element exhibiting favorably weak birefringence and hygroscopicity as well as superior productivity and producing minimal chromatic aberrations by using an organic-inorganic composite material having both the properties of a glass material and those of a plastic material. The present invention is particularly suitable for use as a reflective refracting optical element having an optical power.

What we claim is:

1. An optical element having at least one entrance refracting surface and at least one exit refracting surface, said optical element being formed from an organic-inorganic composite material, wherein at least two transmitting surfaces of said optical element have an optical power, wherein said optical element has at least one reflecting surface, and wherein when a light ray passing through a center of an object and a center of a stop is defined as an axial principal ray, said axial principal ray is bent in said organic-inorganic composite material, and wherein said at least one reflecting surface has an optical power.

2. An optical element according to claim 1, wherein said organic-inorganic composite material consists essentially of an organic phase and an inorganic phase dispersed in a three-dimensional network (matrix) of the organic phase.

3. An optical element according to claim 2, wherein the organic phase of said organic-inorganic composite material is formed from a mixed material of an organic polymer and a glass precursor.

4. An optical element according to claim 2, wherein said organic-inorganic composite material has covalent bonding between the organic phase and the inorganic phase.

5. An optical element according to claim 2, wherein said inorganic phase dispersed in the three-dimensional network of the organic phase has a micro structure not larger than 100 nanometers in size.

6. An optical element according to claim 2, wherein the inorganic phase of said organic-inorganic composite material is formed from a metallic compound.

7. An optical element according to claim 1, which is formed by injection-molding said organic-inorganic composite material.

8. An optical element according to claim 1, wherein said at least one reflecting surface has a rotationally asymmetric surface configuration that corrects decentration aberrations due to decentration.

9. An optical element according to claim 1, wherein said optical element has at least two reflecting surfaces, wherein at least one of said at least two reflecting surfaces has a rotationally asymmetric surface configuration that corrects decentration aberrations due to decentration.

10. An optical element according to claim 9, which has two reflecting surfaces, wherein the entrance refracting surface and the exit refracting surface are disposed to face each other so that the axial principal ray passes along a substantially round-trip optical path.

11. An optical element according to claim 9, wherein the entrance refracting surface and the exit refracting surface are placed adjacent to each other so that the axial principal ray passes along a substantially intersecting optical path.

12. An optical element according to claim 1, which is positioned in a vicinity of a stop of an optical system.

13. An optical element according to claim 1, which is positioned in a vicinity of an object or an image plane.

14. An optical element according to claim 1, wherein the following condition is satisfied:

$$\nu > -195n + 352.5 \tag{1}$$

where n is a refractive index for the spectral d-line of said organic-inorganic composite material and $\nu$ is an Abbe's number thereof.

15. An optical element according to claim 1, wherein the following condition is satisfied:

$$\nu > -175n + 326 \tag{2}$$

where n is a refractive index for the spectral d-line of said organic-inorganic composite material and $\nu$ is an Abbe's number thereof.

16. An optical element according to claim 14, wherein the following condition is satisfied:

$$20 < \nu < 65. \tag{3}$$

17. An optical element according to claim 14, wherein the following condition is satisfied:

$$1.6 < n < 1.9. \tag{4}$$

* * * * *